United States Patent [19]

Deloustal

[11] 4,306,749
[45] Dec. 22, 1981

[54] CHILD'S SUPPORT ASSEMBLY
[75] Inventor: Bernard Deloustal, Anglet, France
[73] Assignee: Baby Relax, Anglet, France
[21] Appl. No.: 104,467
[22] Filed: Dec. 17, 1979
[30] Foreign Application Priority Data
 Dec. 22, 1978 [FR] France ................. 78 36176
[51] Int. Cl.³ ............................................ A47D 4/02
[52] U.S. Cl. .................................. 297/440; 248/188;
   248/408
[58] Field of Search ................... 297/130, 440, 134;
   248/188, 468, 187, 220.2

[56] References Cited
U.S. PATENT DOCUMENTS

| 2,310,346 | 2/1943 | Bell | 248/408 |
| 2,969,830 | 1/1961 | Thompson | 297/130 X |
| 3,443,784 | 5/1969 | Walkinshaw | 248/408 |
| 3,960,352 | 6/1976 | Plottner et al. | 248/188 |
| 4,150,851 | 4/1979 | Cienfuegos | 248/408 |

FOREIGN PATENT DOCUMENTS 864573 4/1961 United Kingdom ............... 297/130

Primary Examiner—Francis K. Zugel
Attorney, Agent, or Firm—Irvin A. Lavine

[57] ABSTRACT

The invention relates to a child's support assembly comprising a seat and a support stand.

The support stand is a base with a large bottom part and a small top part which is hollowed out so as to receive a projecting part of the seat. The connection between the seat and the support stand is a removable one and is made by means of a locking finger controlled by a pedal working against a spring.

The invention is applied in the production of articles for child's care.

1 Claim, 2 Drawing Figures

U.S. Patent  Dec. 22, 1981  4,306,749
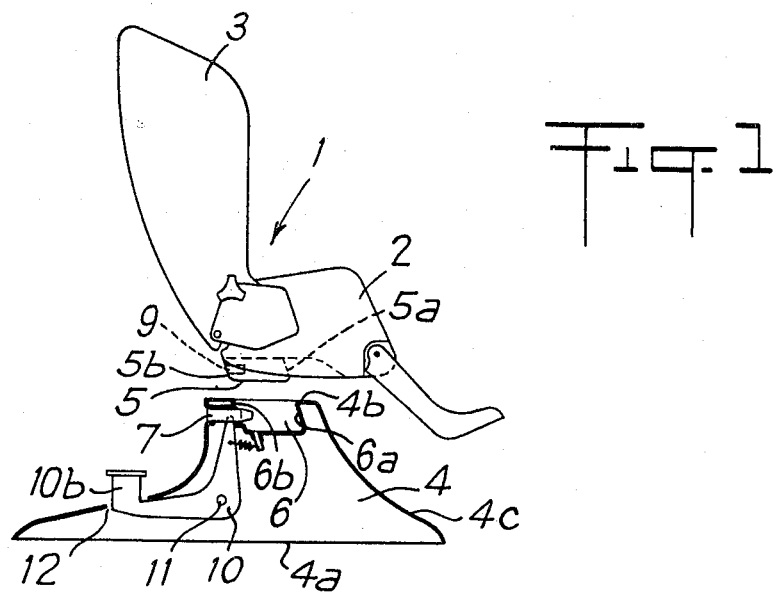
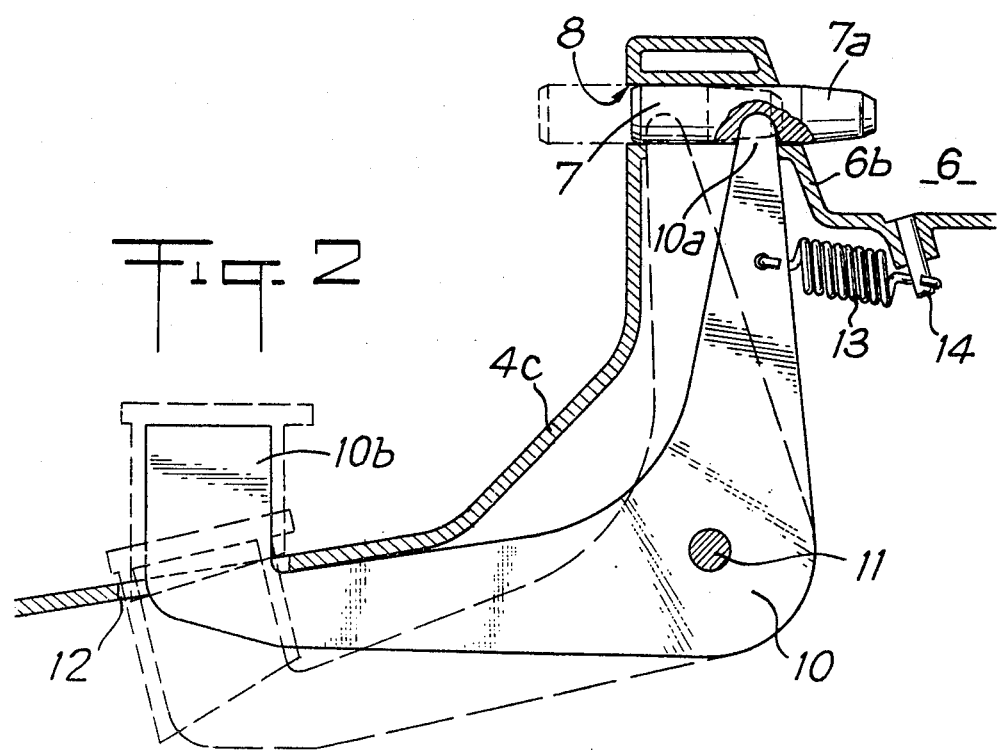

CHILD'S SUPPORT ASSEMBLY

Most seats created for children, whether or not they are in two parts reclinable with respect to one another, are equipped with a tubular support allowing them to rest on the ground or on a horizontal surface. In general, the said support allows the seat—one-piece seats in particular —to be reclined by means of various possible connecting points provided between the seat and the support. In addition, the said support is removable when the seat is intended to be fitted inside a motor vehicle.

Such known devices have many drawbacks. First the removability, when it exists, requires a dismantling which, without being actually complex, necessitates a number of operations and consequently is relatively lengthy. Moreover, the tubular nature of the said supports makes them rather unattractive to look at. Finally, the currently applied security norms have divided children's seats into two groups: those intended, virtually exclusively, for motor vehicle transport and thus with no possibility of being mounted on a support stand, and those intended for other uses, and therefore, nearly all including a fixed support.

It is the aim of the present invention to overcome these drawbacks, and also to offer a rational and easy-to-work solution to the absence of supports in safety seats for children.

To this effect, the present invention proposes a child support assembly, comprising a seat provided at its lower part with a support stand consisting of a base which is hollowed out in its upper part so as to removably receive a projecting part whose shape substantially complements that of the hollowed part, and which is provided at the bottom of the seating portion of the seat. According to the invention, the said projecting and hollowed parts are each provided with at least two parallel back and front walls inclined towards the front of the seat and of the base whereas a member for locking the said projecting part in the said hollow part is provided between the support and the seating portion of the seat.

According to a preferred embodiment of the invention, the locking member consists in a movable finger, mounted for sliding in the base between a first position in which one of its ends projects inside the said hollowed part and a second position in which the said end is retracted inside the said base whereas the said projecting part comprises a laterally open recess correspondingly situated with respect to the said end of the finger and adapted to receive them.

According to this embodiment, the said finger and recess are disposed crosswise of the rear walls of the hollowed part of the base and the projecting part of the seat, respectively.

Advantageously, a resilient return member is coupled between the said finger and the said base and its effect is to place the finger in its aforesaid first position whereas a member for operating the finger against the effect of the said resilient member is coupled to the said finger and can be reached by the user from the outside of the base.

More specifically, the said operating member is constituted by a lever fitted inside the said base and pivotally connected thereto by its median part, one of its ends cooperating with means for causing the said finger to slide, whereas its other end is shaped as a pedal which projects outside the said base.

Finally, to ensure a great stability of the whole assembly, and in particular when the backrest of the seat is reclinable with respect to the seating portion, the hollow part is shifted towards the front of the base.

The invention will be more readily understood from the following description with reference to the accompanying drawings in which:

FIG. 1 is a general view of the assembly according to the invention,

FIG. 2 is a cross-section, on a larger scale, of the device provided for connecting the seat to the stand.

Said figures illustrate a child's seat 1, comprising a seating portion 2 and a backrest 3, said backrest being in the illustrated example, reclinable with respect to the seating portion. Said seat is adapted to be received by a support or base 4, provided with a large bottom part 4a and a small top part 4b substantially parallel together, and joined up by a lateral wall 4c. Said top and bottom parts may be of any shape (circular or polygonal) and the base defines a hollow volume which can be open at its bottom 4a.

The seat 1 is provided at the base of its seating portion 2 with a projection 5, whereas the small part 4b is provided with a recess 6, which is meant to receive the said projection 5. Said latter comprises at least two side walls 5a and 5b, substantially parallel together, situated at the front and at the back of the said projection, and inclined in the direction of the front of the seat. In the same way, the recess 6 is provided with at least two side walls 6a and 6b, which are parallel and similarly inclined in the direction of the front of the base. The other side faces of the projection 5 and of the recess 6 may be cylinder-shaped, cone-shaped or constituted by plane walls converging downwards.

It is clear from this arrangement that the recess 6 is provided at the front with a reflex angle in which can fit the salient angle at the front of the projection 5, this permitting to hold the seat in position in the support when said seat is reclining.

The said base is further provided with a finger 7, mounted to slide inside an opening 8 provided in the top part of the base. In a first position shown in block lines in FIG. 2, the finger 7 projects inside the recess 6 by its end 7a. In a second position, shown in broken lines in the same figure, the finger is retracted and its end 7a is contained inside the opening 8. Said opening 8 is provided in the embodiment shown in the figures, in such a way as to issue into the recess 6 through the rear wall 6b of the latter; but it can also be situated in any other position, except in a position where it issues through the walls 6a of the recess which form the reflex angle.

The projection 5 is itself provided with a recess 9 which is found to be in line with the opening 8 when the seat is set in position on its base. Said recess 9 can thus receive the end 7a of the finger 7 which constitutes a means for locking the seat in position on the base as well as a holding means for the seat when this is tipped forward.

The finger 7 can be subjected to the action of a resilient return member which tends to place it in its locking position, i.e. in the position where its ends 7a projects inside the recess 6. In this way, the seat is automatically locked in position by setting it simply on the base. In this case, it is necessary to provide a hand-operated means for moving the finger 7 against the effect of the return member. FIG. 2 illustrates a preferred embodiment of the means for operating the locking finger 7. A bent lever 10 is pivotally mounted in 11 on the base 4. One of its ends 10a fits in a slot 7b of the finger 7 whereas its other end 10b can be reached from the outside of the said base and traverses the side wall through an opening 12. Said end 10b is shaped as a pedal. The resilient return member is constituted in this instance by a spring 13 coupled between the lever and an anchoring point 14, integral with the base, its effect being to pull the lever in a position in which, on the one hand, the finger 7 projects inside the recess 6, on the other hand, the pedal 10b is in its extreme outward position.

It is therefore clear that, with the locking arrangements described in the foregoing, it is enough to press down the pedal with the foot, to release the seat which can then be withdrawn from the recess 6. On the contrary, when fitting it in the base, there is no need to actuate the lever since the projection 5, passing in front of the finger 7, causes same to go in, until said finger engages the recess 9.

It should finally be noted that in order to increase the stability of the support assembly, the large part 4a is shifted backwards with respect to the small part 4b. It is thus possible to prevent the distribution of the weight of the child's body from shifting backwards, especially when the backrest is reclined.

The invention finds an interesting application in the production of articles for child's care.

It is not limited to the description given hereinabove, but on the contrary covers any variants that can be made thereto without departing from its scope or its spirit.

What is claimed is:

1. A childs's support assembly comprising a seat, a base, and means for releasably securing said seat and said base,
    (a) said seat comprising;
        (i) means for supporting a child,
        (ii) a projection extending downwardly from said supporting means and having substantially parallel back and front walls inclined towards the front of the seat, said projection having a recess in the said back wall thereof,
    (b) said base comprising generally parallel upper and lower parts and connecting upstanding walls,
        (i) means in said upper part defining an upwardly opening hollowed out portion comprising substantially parallel back and front walls inclined towards the front of the base, said hollowed out portion having a size and shape to complimentarily receive said projection in mating engaging relationship,
        (ii) said base lower part having a portion extending substantially further rearwardly of said means defining said hollowed out portion than said lower part extends forwardly thereof, said base having an opening in the rearwardly extending portion thereof,
        (iii) said rear wall of said means defining said hollowed out portion having a transverse opening therein,
    (c) means on said seat and said base for aligning said recess and said opening when said projection is in mating relationship with said means defining said hollowed out portion, and
    (d) said means for releasably securing said seat and said base comprising:
        (i) a finger,
        (ii) means in said base for mounting said finger for sliding movement in said opening between a first position in which an end thereof projects into said recess and a second position in which said end is withdrawn from said recess,
        (iii) resilient means engaging said base for urging said finger towards said first position thereof, and
        (iv) means for effecting movement of said finger from said first position to said second position comprising a lever having one end connected with said finger, means pivotally mounting said lever in said base, and the other end of said lever extending through said opening in the rearwardly extending portion of said base.

* * * * *